United States Patent
Lee et al.

(10) Patent No.: US 7,657,173 B2
(45) Date of Patent: Feb. 2, 2010

(54) OPTICAL LENS SYSTEM OF MOBILE CAMERA

(75) Inventors: Sang Hyuck Lee, Suwon (KR); Ho Seop Jeong, Seongnam (KR); Ho-Sik You, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 453 days.

(21) Appl. No.: 11/606,341

(22) Filed: Nov. 30, 2006

(65) Prior Publication Data

US 2007/0147825 A1    Jun. 28, 2007

(30) Foreign Application Priority Data

Dec. 28, 2005    (KR) .................. 10-2005-0131358

(51) Int. Cl.
G03B 7/099    (2006.01)
G03B 35/00    (2006.01)
H04N 9/07    (2006.01)

(52) U.S. Cl. .............. 396/275; 396/331; 396/333; 348/262; 348/266; 348/280; 348/337

(58) Field of Classification Search .......... 396/268, 396/275, 324, 331, 333; 348/272, 340, 267, 348/280, 262, 266, 336, 337; 356/127
See application file for complete search history.

(56) References Cited

U.S. PATENT DOCUMENTS

| | | | | |
|---|---|---|---|---|
| 4,912,500 A | * | 3/1990 | Yokota et al. ............. | 396/111 |
| 5,349,403 A | * | 9/1994 | Lo ............................ | 396/324 |
| 5,581,314 A | * | 12/1996 | Yoneyama et al. ......... | 396/331 |
| 5,727,242 A | * | 3/1998 | Lo et al. .................... | 396/324 |
| 6,414,791 B1 | * | 7/2002 | Sugawara .................. | 359/497 |
| 6,646,818 B2 | * | 11/2003 | Doi ........................... | 359/725 |
| 2007/0034777 A1 | * | 2/2007 | Tuckerman et al. ....... | 250/208.1 |
| 2007/0036537 A1 | * | 2/2007 | You et al. .................. | 396/333 |

FOREIGN PATENT DOCUMENTS

KR    10-2005-0014108    2/2005

* cited by examiner

*Primary Examiner*—W. B. Perkey
*Assistant Examiner*—Dennis Hancock

(57) ABSTRACT

An optical lens system of a mobile camera is provided. The lens optical system includes: an optical lens in which bilaterally symmetrical off-axis lens systems corresponding to the divided view angles are integrally formed and arranged in parallel on the same plane, the optical beams incident at the divided view angles being transmitted through the respective off-axis lens systems; and an image sensor for receiving the optical beams transmitted through the off-axis lens systems, the image sensor being bisected into a green light receiving region and a mixed light receiving region of red and blue colors. Accordingly, the mega resolution can be achieved using the optical lens having the height of VGA grade. Moreover, as the whole length of the optical lens system in the mega optical system is greatly reduced, the camera optical system can have the slim profile.

10 Claims, 5 Drawing Sheets

[FIG. 1]
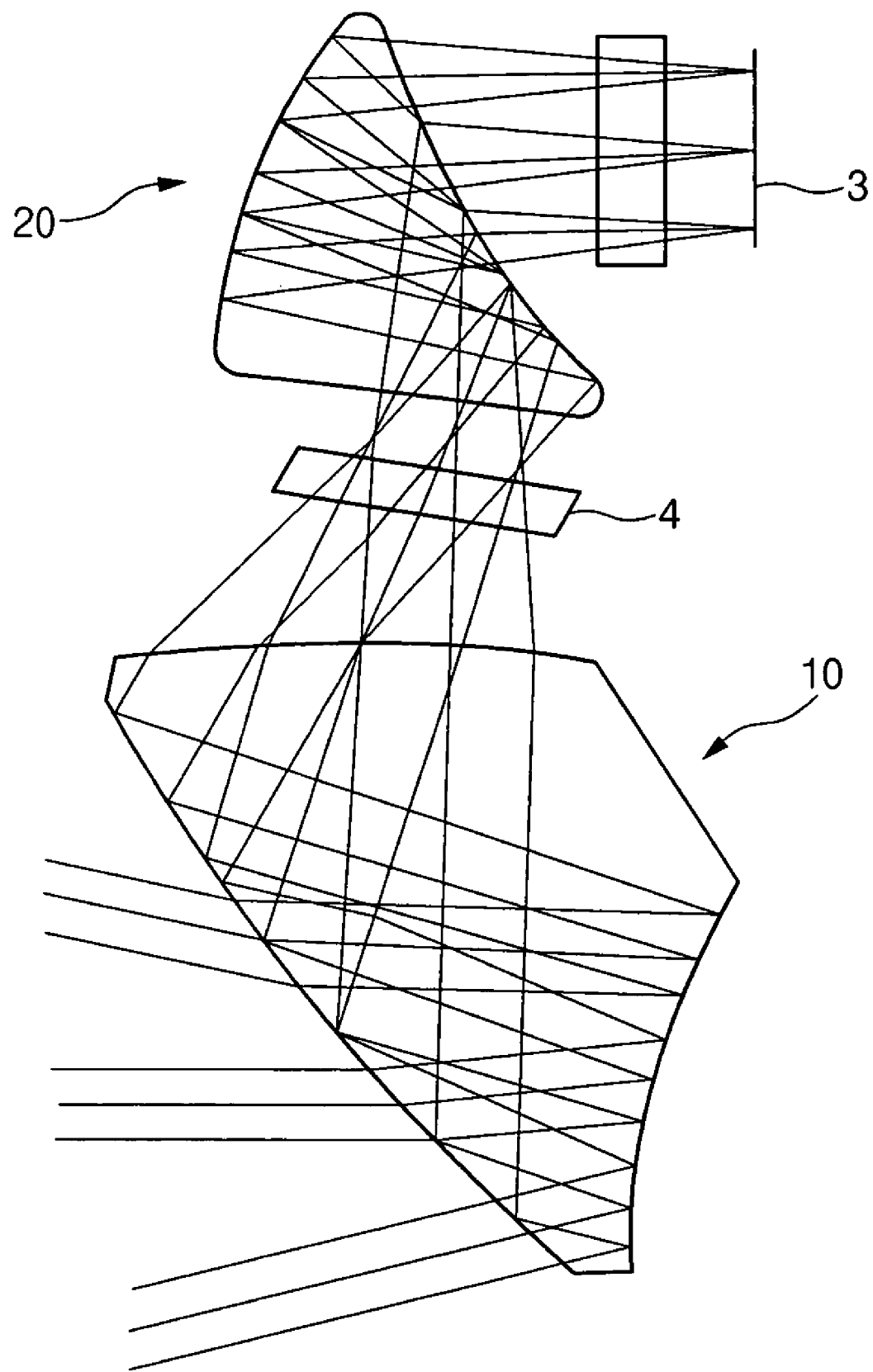

[FIG. 2]
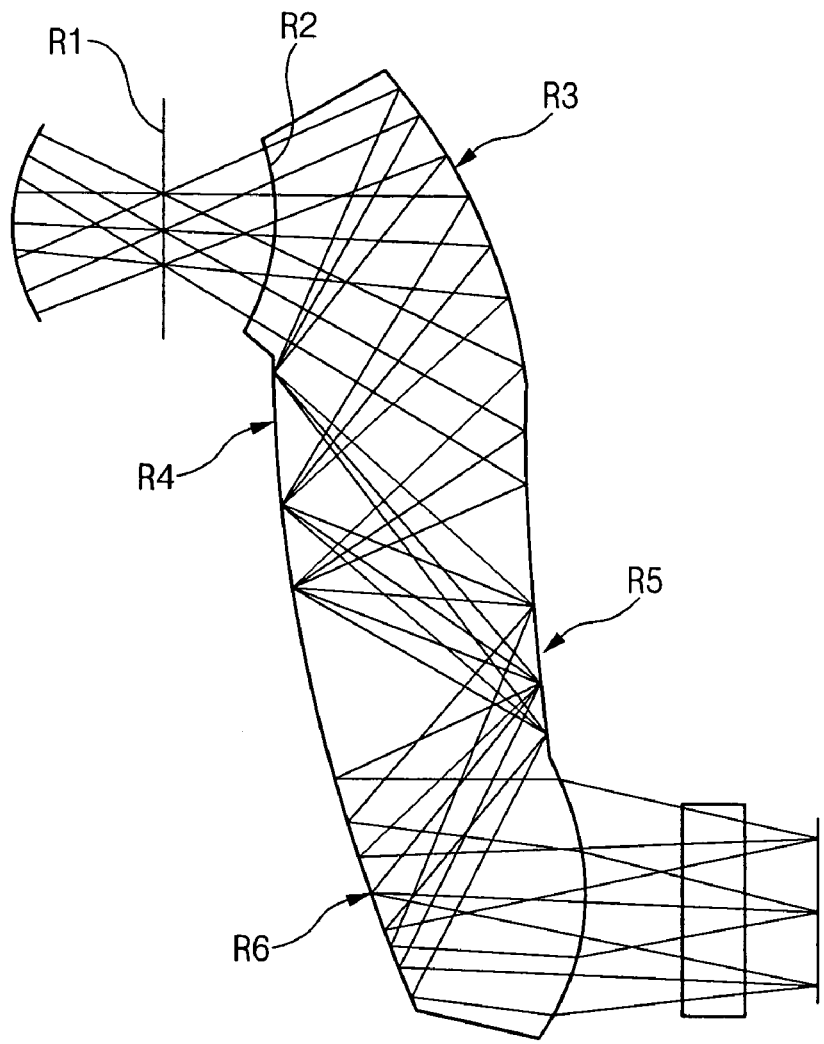
[FIG. 3]
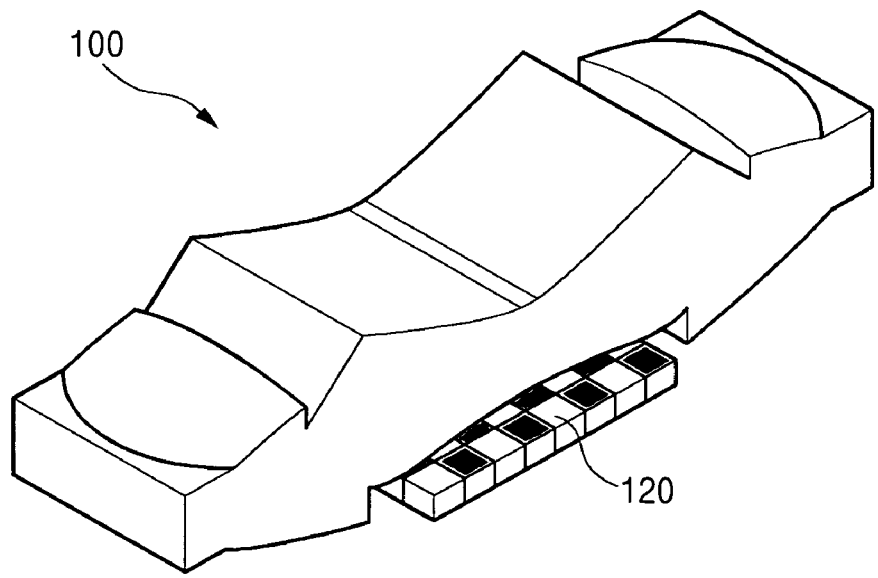

[FIG. 4]
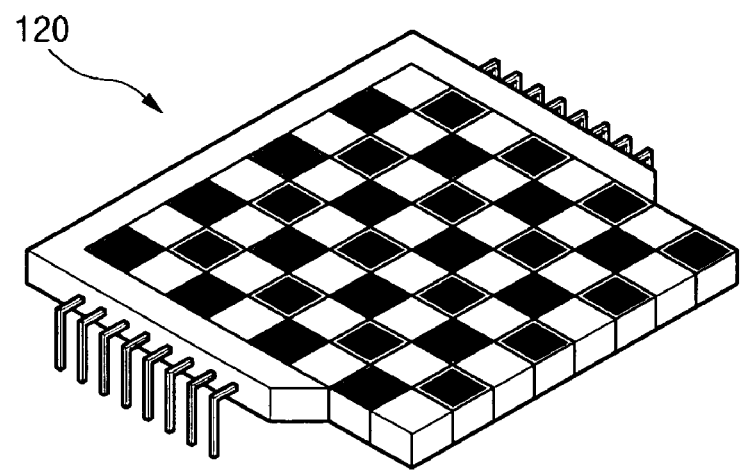
[FIG. 5]
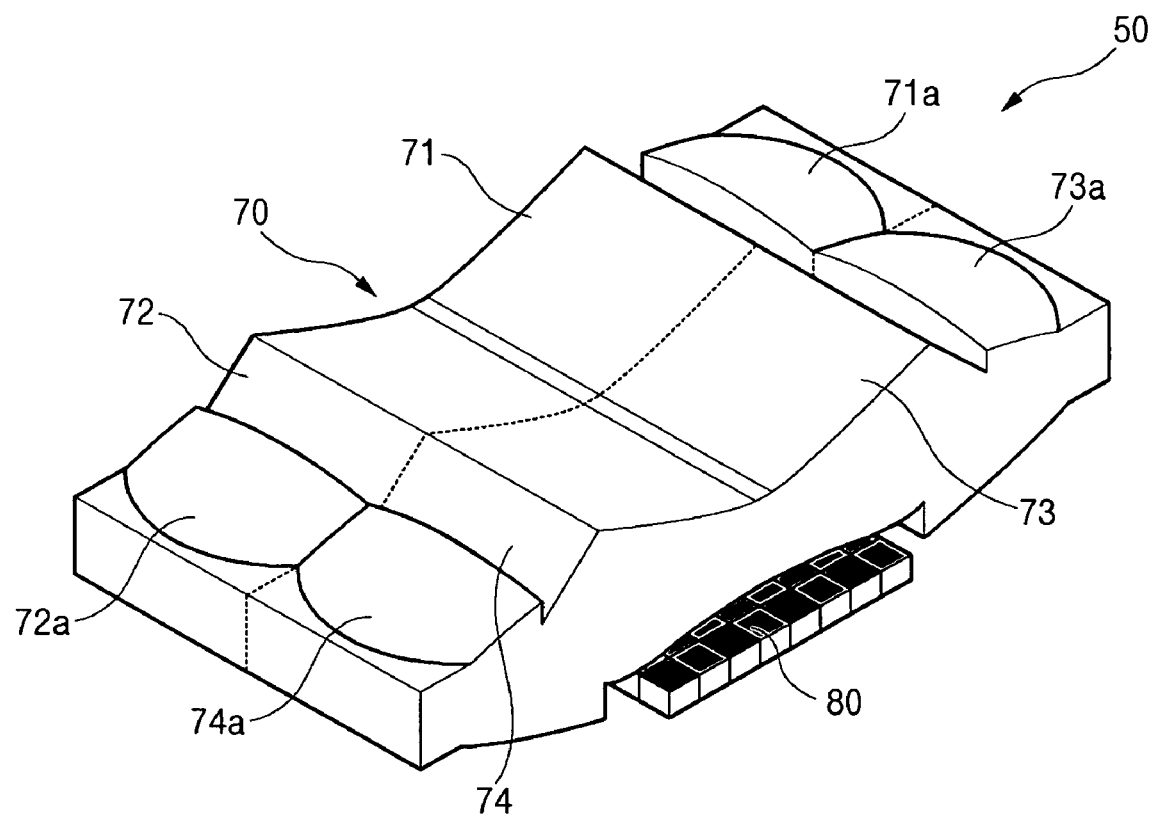

[FIG. 6]
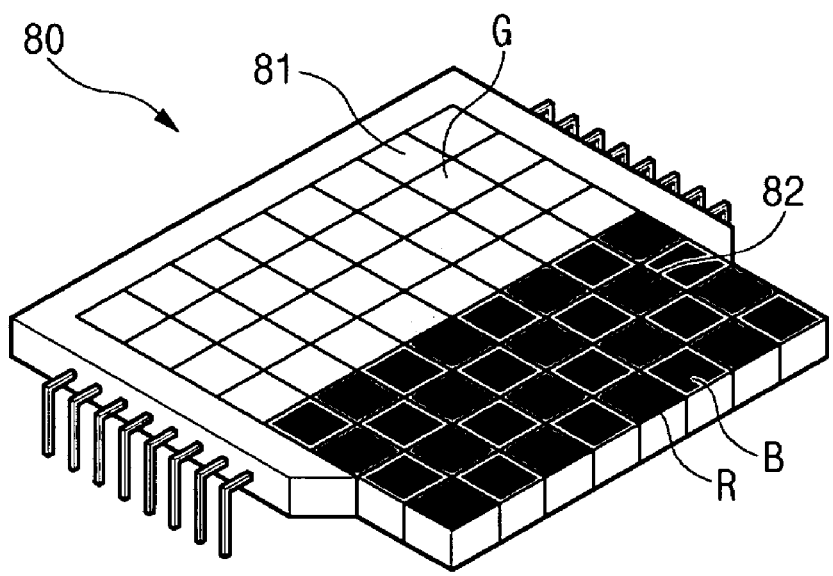
[FIG. 7]
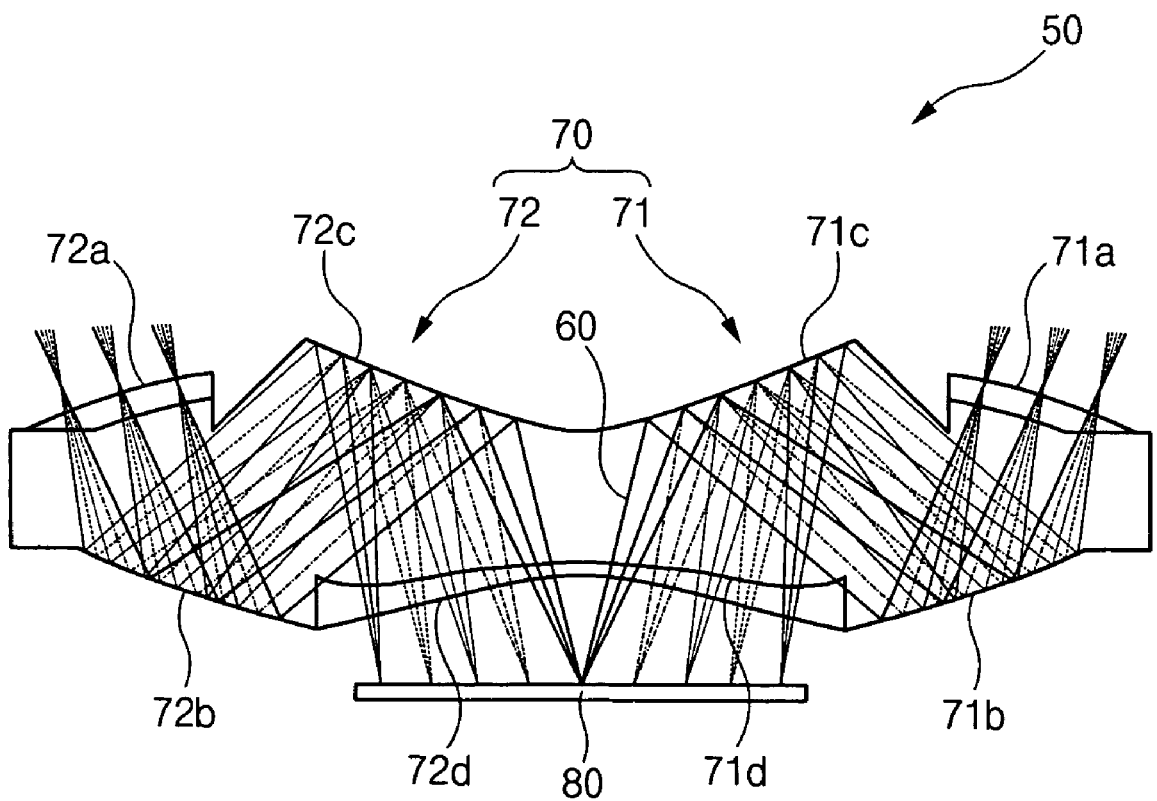

[FIG. 8]
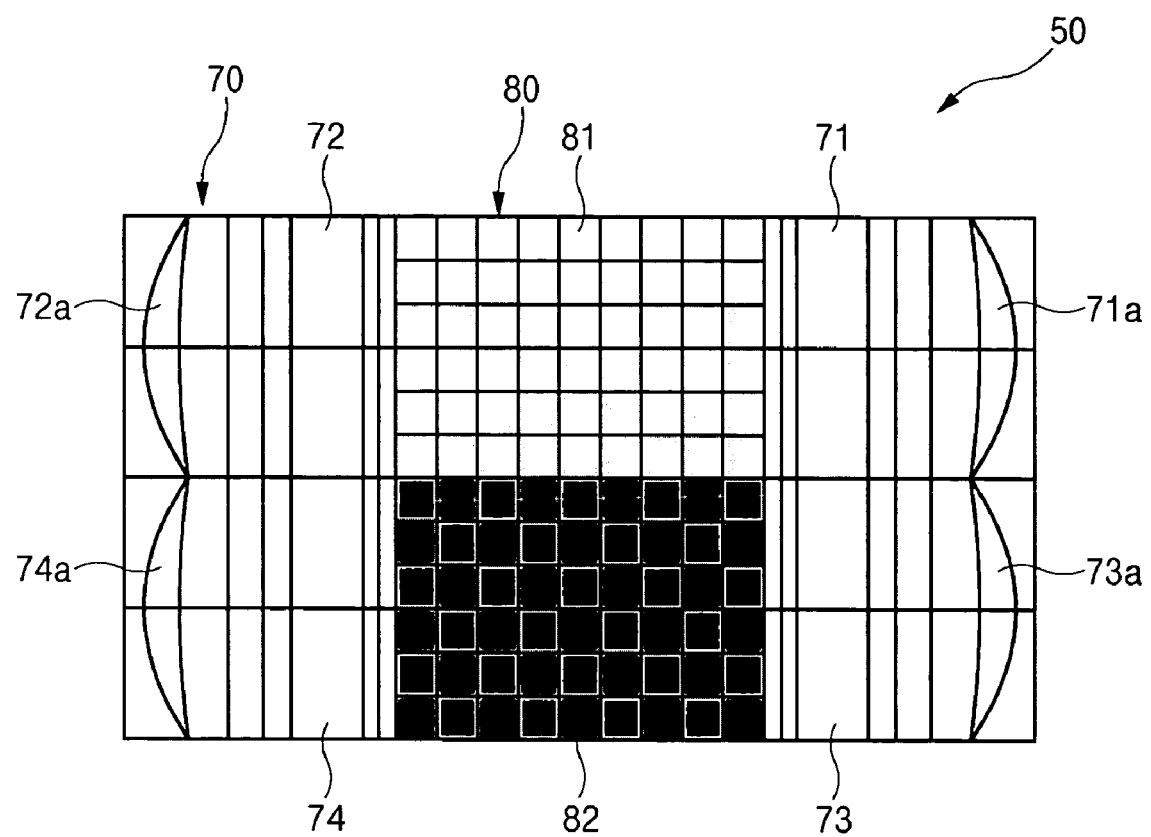

OPTICAL LENS SYSTEM OF MOBILE CAMERA

CROSS-REFERENCE TO RELATED APPLICATIONS

This application claims the benefit of Korean Patent Application No. 2005-131358 filed with the Korean Industrial Property Office on Dec. 28, 2005, the disclosure of which is incorporated herein by reference.

BACKGROUND OF THE INVENTION

1. Field of the Invention

The present invention relates to an optical lens system of a mobile camera. The optical lens system of the mobile camera includes one pair of off-axis lenses and an image sensor. One pair of off-axis lenses has two or more lens systems corresponding to divided view angles and is arranged in parallel. The image sensor is bisected such that the optical beams transmitted through the lens systems are separately received according to colors. Accordingly, the optical lens system of the mobile camera can have slim profile, and the mega resolution can be achieved using the optical lens having the height of VGA grade.

2. Description of the Related Art

With the recent development of mobile terminals such as portable phones and personal digital assistants (PDAs), the mobile terminals provide a phone call function and are used as a multi-convergence device having various functions. The most representative of the multi-convergence is a camera module. The resolution of the camera module changes from 300,000 pixels (VGA) to 700,000 pixels. Moreover, the camera module provides various additional functions, such as auto-focusing (AF) and optical zoom.

Generally, compact camera modules (CCMs) are applied to various IT devices, such as camera phones, smart phones, mobile communication terminals, and toy cameras. Recently, products using the CCMs to meet consumers' various tastes are increasingly put on the market.

The camera modules are manufactured using main parts of charge coupled device (CCD) or complementary metal oxide semiconductor (CMOS) image sensors and lenses. Incident light transmitted through the lens is condensed by the image sensor and is stored as data in the memory. The stored data is displayed as an image through a display medium, such as liquid crystal display (LCD) or PC monitor.

Recently, with the development of digital technologies, the improvement of image compression/decompression technologies, and the technical improvement of peripheral devices of multimedia products, lenses for the mobile cameras have been continuously developed and researched for slim profile and miniaturization. To cope with these trends, mobile cameras are required which have the improved performance and the improved portability, as optical systems for ultraslim camera lenses are included therein.

According to the related art, coaxial lenses are widely used as the optical lenses of mobile cameras. In such a conventional coaxial lens, a plurality of rotationally symmetrical lenses are arranged in a longitudinal direction with respect to an optical axis. Therefore, there is a limitation in reducing the thickness of the longitudinally arranged lenses in the optical axis. Specifically, it is very difficult to achieve the miniaturization of the digital mobile devices because the whole length of the lens system of the mobile camera is determined at a level that is almost equal to the diagonal length of the image sensor.

To solve these problems, an optical lens system using prism lens and an optical lens system using a relay-type off-axis image forming lens have been proposed to achieve the miniaturization of the mobile device. An optical lens using a prism lens and an improved optical lens system using a divided off-axis lens system are disclosed in Korean Patent Application No. 10-2005-0073384, filed by the present applicant. Hereinafter, the optical lens and the improved optical lens system will be described with reference to FIGS. 1 and 2.

Referring to FIG. 1, the optical lens system using the prism lens includes a first prism 10, a second prism 20, a low pass filter (LPF) 4, and an image plane 3, thereby constituting an optical system of a mobile camera. A ratio of a whole length of the optical system to a diagonal length of an image sensor is in a range from 2.4 to 4.3. Therefore, the entire length of the optical system can be reduced within a very limited range.

As another example of the related art, the optical lens system using the off-axis image forming lens of FIG. 2 includes a first plane R1, a second plane R2, a third plane R3, a fourth plane R4, a fifth plane R5, and a sixth plane R6. Specifically, the first plane R1 is an aperture, the second plane R2 is a refraction plane on a coaxis with respect to the first plane R1, and the third plane R3 is a reflection plane inclined with respect to the second plane R2. The fourth plane R4 and the fifth plane R5 are reflection planes that are shifted and inclined with respect to the respective front surfaces. The sixth plane R6 is a refraction plane that is shifted and inclined with respect to the fifth plane R5.

In the integrated off-axis image forming lens system, however, the ratio of the whole length of the optical system to the diagonal length of the image sensor is in the range from 2.4 to 4.3. Therefore, there is a great limitation in securing a wide view angle in a single image sensor and reducing the entire thickness of the optical system.

Accordingly, in order to implement a wide angle of view and reduce the whole length of the optical system for the mobile camera, an additional optical lens system, as well as the lens system using the prism or the integrated off-axis image forming lens system, has to be implemented. An optical lens system using two or more off-axis lens systems is disclosed in Korean Patent Application filed on Aug. 10, 2005 by the present applicant. This optical lens system will be described in brief with reference to FIGS. 3 and 4.

In the conventional optical lens system of FIG. 3, the view angle is equally divided into more than two angles. The optical lens system includes a plurality of off-axis lens systems 100 and a single image sensor 120. The plurality of off-axis lens systems correspond to the divided view angles and transmit optical beams incident at the divided angels of view, and the single image sensor 120 receives the optical beams transmitted through the plurality of lens systems.

Referring to FIG. 4, the single image sensor 120 includes unit pixels each receiving only one of blue (B), red (R) and green (G) colors. The unit pixels are arranged alternately and regularly.

In this case, if an image sensor uses a lot of pixels for mega-pixel camera, the size of the image sensor increases. Thus, the size and height of the camera optical lens inevitably increases. Therefore, as the number of the pixels increases, the size of the camera will increase.

The image sensor having a lot of pixels must have the optical lens with excellent resolution. However, it is difficult to design the lens having the resolution suitable for the size of the image sensor.

SUMMARY OF THE INVENTION

An advantage of the present invention is that it provides an optical lens system of a mobile camera, which can provide the mega resolution and the slim profile. The optical lens system includes one pair of optical lenses arranged in parallel and an image sensor. In the optical lenses, a plurality of off-axis lens systems corresponding to the divided view angles are symmetrically formed. The image sensor is bisected into red, blue and green light receiving regions, such that the optical beams transmitted through the plurality of off-axis lens systems are independently received therein.

Additional aspects and advantages of the present general inventive concept will be set forth in part in the description which follows and, in part, will be obvious from the description, or may be learned by practice of the general inventive concept.

According to an aspect of the invention, a lens optical system of a mobile camera includes: a pair of optical lenses in which bilaterally symmetrical off-axis lens systems corresponding to the divided view angles are integrally formed on the same plane and which are arranged in parallel, the optical beams incident at the divided view angles being transmitted through the respective off-axis lens systems; and an image sensor for receiving the optical beams transmitted through the off-axis lens systems, the image sensor being bisected into a green light receiving region and a mixed light receiving region of red and blue colors.

According to another aspect of the present invention, the optical beams, which are incident at the view angles divided by two or more off-axis lens systems having different optical axes, are transmitted through the optical lenses and are condensed in sensing regions of the image sensor corresponding to the respective lens systems, thereby forming a plurality of images.

According to a further aspect of the present invention, the optical beams incident at the divided view angles are transmitted through four off-axis lenses while passing through one pair of optical lenses where off-axis lens systems are formed in a bilateral symmetry. Then, the optical beams are received in the image sensor disposed under the off-axis lenses. The optical beams are received in the green light receiving region and the mixed light receiving region having the red and blue mosaic form.

According to a still further aspect of the present invention, the image sensor for receiving the optical beams transmitted through the optical lenses of the off-axis lens system is bisected by reference to the central portion thereof and includes a green light receiving region and a mixed light receiving region where red and blue colors are alternately mixed.

In the images formed by receiving the optical beams in the image sensor through the optical lens with a plurality of off-axis lens systems, the images of the same color formed in the light receiving regions of the respective colors are first combined, and then the two images of the different colors combined in the respective light receiving regions are combined into one color image having the same color as the object.

At this point, two images of the different colors are first combined, and the image of the same color is then combined.

On the other hand, the image combining process according to the present invention can also be applied to the reverse case. That is, after the images of the different colors are combined, the images of the same color can be combined. In the case of the reverse image, the images can be combined into one color image by photo stitching or panorama mosaicing.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a schematic diagram of a conventional optical system using a prism lens;

FIG. 2 is a schematic diagram of a conventional optical system using an integrated prism lens;

FIG. 3 is a perspective view of a conventional mobile optical lens system;

FIG. 4 is a perspective view of an image sensor employed in the conventional mobile optical lens system;

FIG. 5 is a perspective view of an optical lens system according to an embodiment of the present invention;

FIG. 6 is a perspective view of an image sensor employed in an optical lens system according to an embodiment of the present invention;

FIG. 7 is a sectional view illustrating transmission paths of optical beams incident on the optical lens system according to the present invention; and FIG. 8 is a plan view of the optical lens system according to the present invention.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures. In the drawings, the thicknesses of layers and regions are exaggerated for clarity.

Hereinafter, an optical lens system of a mobile camera according to the embodiments of the present invention will be understood more fully with reference to the accompanying drawings.

First, a basic concept about the division of a view angle of a camera will be described. The division of the view angle is the precondition for constructing the optical lens system according to the present invention. The view angle represents an angle at which the camera lens can capture an object. In a general camera optical system, the view angle is determined at about 60°. The concept about the division of the view angle of the camera is to achieve a view angle of about 60° through the view angle of 30° by using a plurality of cameras having different axes and narrow view angle of about 30°.

That is, in the optical lens system having off-axis lens systems provided on both sides, the optical beams whose view angles are divided in the mobile camera are incident on the off-axis lens systems, respectively. Therefore, the present invention can have the same effect as the case of using two cameras that maintain narrow angle of view about 30☐ by the divided view angles. At this point, the image of the object is condensed in the image sensor through the two off-axis lens systems having the different optical axes, and only the half of the image is obtained through the respective light receiving regions of the image sensor. A process of combining the images formed in the respective light receiving regions through a separate program is required.

FIG. 5 is a perspective view of an optical lens system according to an embodiment of the present invention, FIG. 6 is a perspective view of an image sensor employed in the optical lens system according to an embodiment of the present invention, FIG. 7 is a sectional view illustrating transmission paths of optical beams incident on the optical lens system according to the present invention, and FIG. 8 is a plan view of the optical lens system according to the present invention.

Referring to FIGS. 5 to 8, the optical lens system 50 includes an optical lens 70 and an image sensor 80. The optical lens 70 includes a plurality of off-axis lens systems 71 and 72 transmitting optical beams 60 which are incident at view angles divided into more than two angles. The image sensor 80 is bisected such that the optical beams 60 transmitted through the off-axis lens systems 71 can be separately received for each color.

The view angle of the mobile camera is divided such that the optical beams 60 incident through the plurality of off-axis lens systems 71 and 72 are divided and incident through the different optical axes. The optical beams 60 incident on both sides of the optical lens 70 by the divided view angles are received in the image sensor 80 through the respective off-axis lens system 71.

In addition, the optical lens 70 includes the bilaterally symmetrical off-axis lens systems 71 and 72 where a plurality of off-axis lenses 71a and 72a are formed symmetrically on both sides. Therefore, four off-axis lens systems 71 to 74 are symmetrically combined in parallel on the same plane, thereby forming one body. The optical beams 60 transmitting through the respective off-axis lens systems 71 to 74 step by step are incident at the divided view angles.

That is, the optical lens 70 is bilaterally symmetrical on the same plane and divided into a first off-axis lens system 71, a second off-axis lens system 72, a third off-axis lens system 73, and a fourth off-axis lens system 74. The optical beams 60 incident through the off-axis lenses 71a, 72a, 73a and 74a provided at the outside of the respective off-axis lens systems 71 to 74 are repetitively reflected and emitted with respect to the respective lens surfaces of the off-axis lens systems. In this manner, the optical beams 60 are commonly incident on the image sensor 80 disposed under the respective off-axis lens systems 71 and 72. Consequently, the individual images are formed on the image sensor 80. At this point, the optical lens 70 can be mass-produced by injection molding and wafer scale.

Referring to FIG. 7, the off-axis lens systems 71 to 74 of the optical lens 70 are bilaterally symmetrical to one another such that they have the plurality of lens surfaces 71a to 71d. In more detail, the off-axis lens system 71 includes a lower reflection surface 71b, an upper reflection surface 71c, an incident surface 71a, and an emission surface 71d.

At this point, the optical beams 60 incident through the optical lens 70 are transmitted and the transmitted optical beams 60 are formed on the image sensor 80, thereby acquiring the image of the object. In this process, the optical beams 60 are incident at the view angle of about 30°, which is divided by the mobile camera using the lens optical system 50 of the present invention. Then, the optical beams 60 are transmitted through the optical lens 70 and formed on the image sensor 80 formed under the optical lens 70. The optical beams 60 incident at the divided view angles are incident through the off-axis lens 71a, which is the incident surface of the first to fourth off-axis lens systems 71 to 74. Then, the optical beams 60 are sequentially reflected from the lower and upper reflection surfaces 71b and 71c at an angle perpendicular to the incident angle and are transmitted through the emission surface 71d. The images of the optical beams 60 transmitted through the respective off-axis lens systems 71 to 74 are formed in the regions of the image sensor 80 corresponding to the respective off-axis lens systems 71 to 74.

The image sensor 80 where the images of the optical beams 60 transmitted through the off-axis lens systems 71 to 74 are formed is bisected by reference to the center portion thereof depending on the color regions. One side is the green light receiving region 81 where only the green color is received, and the other side is the mixed light receiving region 82 where the red color and the blue color are mixed.

In the image sensor 80, the optical beams 60 transmitted through the respective off-axis lens systems 71 to 74 are condensed at the corresponding light receiving regions 81 and 82, thereby forming the image. The images formed in the image sensor 80 by the optical beams 60 transmitted through the lens systems 71 to 74 at the divided view angles are only half of the image captured at the view angles according to the light receiving regions 81 and 82. The images according to the off-axis lens systems 71 to 74 are combined into one image by a separate program. In the case of the inverse image, the off-axis lens systems 71 to 74 combine the divided images into one image by using photo stitching or panorama mosaicing. In the case of the erect image, the off-axis lens systems 71 to 74 combine the divided images into one image by the precise adjustment of the lenses.

The images formed through the optical lens 70 in the image sensor 80 bisected according to the respective color regions are formed in the respective divided regions by dividing the image sensor 80 by four while the optical beams 60 are transmitted through the four off-axis lens systems 71 to 74 of the optical lens 70.

That is, the green light receiving region 81 and the mixed light receiving region 82 of the red and blue colors are divided into regions corresponding to the off-axis lens systems 71 to 74. Then, a pair of the images formed by the optical beams 60 incident through the off-axis lenses 71a, 72a, 73a and 74a exist in the each of light receiving regions 81 and 82, respectively.

Accordingly, in the combination of the images formed in the image sensor 80, the images formed in the same light receiving region are combined and then the images of different colors combined according to the bisected light receiving regions are combined. In this manner, one color image having the same color as the object is formed. At this point, the image combining process according to the present invention can also be applied to the reverse case. That is, after the images of the different colors are combined, the images of the same color can be combined.

As described above, the plurality of off-axis lens systems corresponding to the divided view angles are symmetrically connected in parallel to form the optical lens. The optical beams transmitted through the plurality of off-axis lens systems of the optical lens are independently received in the green light receiving region and the mixed light receiving region of the red and blue colors in the image sensor. Therefore, the mega resolution can be achieved using the optical lens having the height of VGA grade. Moreover, as the whole length of the optical lens system in the mega optical system is greatly reduced, the camera optical system can have the slim profile.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A lens optical system in which optical beams are incident at view angles divided into a plurality of equal angles by a mobile camera, comprising:
   an optical lens in which bilaterally symmetrical off-axis lens systems corresponding to the divided view angles are integrally formed and arranged in parallel on the same plane, the optical beams incident at the divided view angles being transmitted through the respective off-axis lens systems; and
   an image sensor for receiving the optical beams transmitted through the off-axis lens systems, the image sensor being bisected into a green light receiving region and a mixed light receiving region of red and blue colors.

2. The lens optical system according to claim 1, wherein the optical beams incident at the view angles divided by two or more off-axis lens systems having different optical axes are transmitted through the optical lenses, and are condensed in sensing regions of the image sensor corresponding to the respective lens systems, thereby forming a plurality of images.

3. The lens optical system according to claim 1, wherein the optical lens is bilaterally symmetrical on the same plane and is divided into a first off-axis lens system, a second off-axis lens system, a third off-axis lens system, and a fourth off-axis lens system, and the optical beams incident through off-axis lenses of the respective off-axis lens systems being repetitively reflected and emitted on a plurality of lens surfaces, such that the optical beams are commonly incident on the image sensor disposed under the respective off-axis lens systems.

4. The lens optical system according to claim 2, wherein the optical lens is manufactured by injection molding and wafer scale.

5. The lens optical system according to claim 1, wherein the off-axis lens system is formed in a bilateral symmetry with a plurality of lens surfaces, and includes an upper reflection surface, a lower reflection surface, an incident surface on which the divided optical beams are incident, and an emission surface through which the optical beams reflected from the reflection surfaces are transmitted.

6. The lens optical system according to claim 1, wherein the image sensor is bisected by reference to the central portion thereof and includes a green light receiving region where only a green color is received, and a mixed light receiving region where red and blue colors are alternately mixed.

7. The lens optical system according to claim 1, wherein the optical beams transmitted through the respective off-axis lens systems at the divided view angles are condensed in the respective light receiving regions corresponding to the off-axis lens systems such that images are formed in the image sensor in accordance with positions and colors, and the images formed in accordance with the respective regions are sequentially combined to form one image.

8. The lens optical system according *to claim 6, wherein the images formed in the respective light receiving regions of the image sensor are combined into one color image by photo stitching or panorama mosaicing.

9. The lens optical system according to claim 2, wherein the optical lens is bilaterally symmetrical on the same plane and is divided into a first off-axis lens system, a second off-axis lens system, a third off-axis lens system, and a fourth off-axis lens system, and the optical beams incident through off-axis lenses of the respective off-axis lens systems being repetitively reflected and emitted on a plurality of lens surfaces, such that the optical beams are commonly incident on the image sensor disposed under the respective off-axis lens systems.

10. The lens optical system according to claim 6, wherein the optical beams transmitted through the respective off-axis lens systems at the divided view angles are condensed in the respective light receiving regions corresponding to the off-axis lens systems such that images are formed in the image sensor in accordance with positions and colors, and the images formed in accordance with the respective regions are sequentially combined to form one image.

* * * * *

UNITED STATES PATENT AND TRADEMARK OFFICE
CERTIFICATE OF CORRECTION

| | |
|---|---|
| PATENT NO. | : 7,657,173 B2 |
| APPLICATION NO. | : 11/606341 |
| DATED | : February 2, 2010 |
| INVENTOR(S) | : Sang Hyuck Lee et al. |

Page 1 of 1

It is certified that error appears in the above-identified patent and that said Letters Patent is hereby corrected as shown below:

Title Page; item (75);

First Page, Column 1 (Inventors), Line 2, change "Ho-Sik" to --Ho Sik--.

Column 8, Line 19, change "*to" to --to--.

Signed and Sealed this

First Day of June, 2010

David J. Kappos
*Director of the United States Patent and Trademark Office*